United States Patent
Qiu et al.

(10) Patent No.: US 10,677,359 B2
(45) Date of Patent: Jun. 9, 2020

(54) VALVE SYSTEM AND METHODS THEREOF

(71) Applicant: Tiger Valve Company, Houston, TX (US)

(72) Inventors: Xiaozheng Qiu, Suzhou (CN); Xianjun Lv, Suzhou (CN); Wei Zhu, Suzhou (CN)

(73) Assignee: TIGER VALVE COMPANY, Houston, TX (US)

( * ) Notice: Subject to any disclaimer, the term of this patent is extended or adjusted under 35 U.S.C. 154(b) by 121 days.

(21) Appl. No.: 15/812,183

(22) Filed: Nov. 14, 2017

(65) Prior Publication Data
US 2018/0135761 A1    May 17, 2018

Related U.S. Application Data

(60) Provisional application No. 62/422,234, filed on Nov. 15, 2016.

(51) Int. Cl.
*F16K 1/24* (2006.01)
*F16K 31/60* (2006.01)
(Continued)

(52) U.S. Cl.
CPC .............. *F16K 1/24* (2013.01); *F16J 13/22* (2013.01); *F16K 1/36* (2013.01); *F16K 27/08* (2013.01); *F16K 31/60* (2013.01)

(58) Field of Classification Search
CPC ... F16K 1/36; F16K 1/24; F16K 31/60; F16K 27/08; F16J 13/22; F16L 55/40;
(Continued)

(56) References Cited

U.S. PATENT DOCUMENTS

| 739,755 | A | * | 9/1903 | Martin et al. | ........... | F16K 27/08 |
| | | | | | | 251/264 |
| 957,777 | A | * | 5/1910 | Izer | ........................ | F16K 27/08 |
| | | | | | | 251/264 |

(Continued)

*Primary Examiner* — Craig J Price
*Assistant Examiner* — Andrew J Rost
(74) *Attorney, Agent, or Firm* — Foley & Lardner LLP

(57) ABSTRACT

A valve system comprising a valve body having an opening and an interior; a davit system comprising: a first pillar having an upper end and a lower end, wherein the lower end of the first pillar is attached to the valve body; a second pillar having an upper end and a lower end, wherein the lower end of the second pillar is attached to the valve body; a pivot arm having a first end and a second end, wherein the first end of the pivot arm is rotationally attached to the upper end of the first pillar, the second end of the pivot arm is removably attached to the upper end of the second pillar and the pivot arm straddles the valve body opening when the second end of the pivot arm touches the upper end of the second pillar; and a closure cap system comprising a closure cap, wherein a means for sealing the closure cap is disposed between the closure cap and the valve body; and a cap stem having an upper end and a lower end, wherein the lower end of the cap stem is attached to the closure cap and the upper end of the cap stem is disposed through a central portion of the pivot arm; and wherein a means for lifting and lowering the closure cap engages the cap stem to lift or lower the closure cap is disclosed. A method of using the valve system is also disclosed.

44 Claims, 14 Drawing Sheets

(51) Int. Cl.
*F16K 1/36* (2006.01)
*F16K 27/08* (2006.01)
*F16J 13/22* (2006.01)

(58) Field of Classification Search
CPC . F16L 55/46; B65D 43/0225; B65D 43/0227; B65D 43/0229; B65D 43/02
See application file for complete search history.

(56) References Cited

U.S. PATENT DOCUMENTS

| | | | | |
|---|---|---|---|---|
| 5,690,141 A * | 11/1997 | Creaghe | ............... | B65D 90/10 |
| | | | | 105/360 |
| 6,085,935 A * | 7/2000 | Malchow | ............... | F16J 13/22 |
| | | | | 220/291 |
| 6,786,343 B1 * | 9/2004 | Porebski | ............... | B66C 23/203 |
| | | | | 212/166 |
| 7,341,161 B2 * | 3/2008 | McGuire | ............... | B01J 3/03 |
| | | | | 220/234 |
| 7,556,160 B2 * | 7/2009 | Porebski | ............... | B66C 23/203 |
| | | | | 212/179 |
| 9,297,196 B2 * | 3/2016 | Yang | ............... | F16J 13/22 |
| 9,447,909 B2 * | 9/2016 | Smith | ............... | F16L 17/035 |
| 2013/0025209 A1 * | 1/2013 | Lidster | ............... | F16J 13/08 |
| | | | | 49/359 |

* cited by examiner

VALVE SYSTEM AND METHODS THEREOF

PRIOR RELATED APPLICATIONS

This application claims the benefit of U.S. Provisional Patent Application No. 62/422,234 entitled "Improved Valve System and Methods Thereof," filed on Nov. 15, 2016.

FEDERALLY SPONSORED RESEARCH STATEMENT

Not Applicable (N/A)

REFERENCE TO MICROFICHE APPENDIX

N/A

FIELD OF INVENTION

The present invention relates generally to an improved valve system and methods thereof and, more particularly, to an improved valve system with dual-pillar davit system and a threadless closure cap and methods thereof.

BACKGROUND OF THE INVENTION

Many large valves (e.g., pigging valves) have removable closure caps. The weight of the closure cap becomes cumbersome as the size of the valve increases. For example, the closure cap on a twenty (20) inch diameter pigging valve cannot be removed without use of a davit system.

Generally, prior art davit systems use a single pillar davit system with a cantilever beam to open and support a closure cap. The weight of the closure cap for larger valves (e.g., larger than about twenty (20) inches in diameter) deforms the cantilever beam, making it difficult to align the closure cap with the valve properly.

Typically, closure caps are threaded. Misalignments between the closure cap and the valve can damage or gall the threads, causing the threads to freeze. Threaded closure caps also have other disadvantages. When opening (or closing) the valve, it takes time and effort to unthread (or thread) multiple turns of a cumbersome closure cap. Further, after continuous use under pressure, the threads could shear over time.

Thus, an improved valve system with a dual-pillar davit system and a threadless closure cap is needed to eliminate these problems.

SUMMARY OF THE INVENTION

In an embodiment, a valve system comprises (a) a valve comprising a valve body having an opening and an interior, wherein the valve may be operated to a closed or to an open position; (b) a davit system comprising a first pillar having an upper end and a lower end, wherein the lower end of the first pillar is attached to an upper surface of the valve body; a second pillar having an upper end and a lower end, wherein the lower end of the second pillar is attached to an upper surface of the valve body; a pivot arm having a first end and a second end, wherein the first end of the pivot arm is rotationally attached to the upper end of the first pillar, wherein the second end of the pivot arm is removably attached to the upper end of the second pillar and wherein the pivot arm straddles the valve body opening when the second end of the pivot arm touches the upper end of the second pillar; and (c) a closure cap system comprising a closure cap adapted to seal the valve body opening, wherein a means for sealing the closure cap is disposed between the closure cap and the valve body when the closure cap is in a closed position; and a cap stem having an upper end and a lower end, wherein the lower end of the cap stem is attached to the closure cap and the upper end of the cap stem is disposed through a central portion of the pivot arm; and wherein a means for lifting and lowering the closure cap engages the cap stem to lift or lower the closure cap.

In an embodiment, the valve body has a first end and a second end, the first end of the valve body is fluidly connected to a first adapter or connection pipe and the second end of the valve body is fluidly connected to a second adapter or connection pipe. In an embodiment, the valve body is connected to the first adapter or connection pipe via a bolted connection and the second end of the valve body is connected to the second adapter or connection pipe via a bolted connection. In an embodiment, the first adapter or connection pipe has an equalizer valve disposed through a wall of the first adapter or connection pipe.

In an embodiment, the valve system further comprises a pivot arm bearing, wherein the pivot arm bearing is disposed between the first end of the pivot arm and the upper end of the first pillar. In an embodiment, the valve system further comprises an upper collar thrust bearing and a lower collar thrust bearing, wherein the pivot arm bearing is disposed between the upper collar trust bearing and the lower collar thrust bearing.

In an embodiment the upper end of the first pillar is adapted to accept a cap nut and the upper end of the second pillar is adapted to accept a collar nut.

In an embodiment, the first end of the pivot arm touches a pivot collar of the first pillar and the second end of the pivot arm touches a pivot collar of the second pillar.

In an embodiment, the second end of the pivot arm further comprises a pivot arm handle.

In an embodiment, the means for sealing a closure cap comprises a closure cap O-ring. In an embodiment, the means for sealing a closure cap comprises a cap-to-clamp connection between the valve body and the closure cap.

In an embodiment, the closure cap is a threadless closure cap.

In an embodiment, the valve system further comprises a means for rotating a closure cap, wherein the means for rotating a closure cap engages the closure cap to rotate from an open position to a closed position or from the closed position to the open position. In an embodiment, the means for rotating a closure cap comprises a rack having rack teeth, a gear having an upper end and a lower end and gear teeth on an outer surface, and a gear screw having an upper end and a lower end, wherein the gear is attached to the upper end of the gear screw and the closure cap is attached to the lower end of the gear screw and wherein the rack teeth and the gear teeth engage each other to rotate the closure cap from the open position to the closed position or from the closed position to the open position. In an embodiment, the rack is attached to an upper surface of the closure cap adjacent to the valve body.

In an embodiment, the means for rotating a closure cap further comprises a gear bearing, wherein the gear bearing is disposed between the gear and the upper end of the gear screw. In an embodiment, the means for rotating a closure cap further comprises a hand wrench or gear handle adapted to fit the upper end of the gear screw.

In an embodiment, the means for rotating a closure cap comprises a horizontal handle attached to an upper surface of the closure cap.

In an embodiment, the valve system further comprises a stop plate having a first end and a second end, wherein the stop plate is attached to an upper surface of the closure cap adjacent to the rack and the valve body.

In an embodiment, the valve system further comprises a lock plate, wherein the lock plate is attached to an upper surface of the valve body adjacent to the first end of the stop plate and the valve body opening.

In an embodiment, the valve system comprises a lock plate system, wherein the lock plate system is attached to an upper surface of the valve body and mechanically connected to an upper surface of the closure cap.

In an embodiment, the means for lifting and lowering a closure cap comprises a cap handle or hand wheel attached to an upper end of the cap stem, wherein the cap stem is a threaded cap stem. In an embodiment, the means for lifting and lowering a closure cap further comprises an upper pivot plate, a lower pivot arm plate and a threaded cap stem nut, wherein the upper pivot plate is attached to an upper surface of the pivot arm, the lower pivot arm plate is attached to a lower surface of the pivot arm plate, the threaded cap stem nut is disposed between the upper pivot arm plate and the lower pivot arm plate. In an embodiment, a spring is disposed between the upper pivot arm plate and the threaded cap nut. In an embodiment, a stop block is disposed between the cap handle or hand wheel and the upper pivot arm plate.

In an embodiment, the means for lifting and lowering a closure cap comprises a slotted cap stem and a jack system attached to an upper surface of the pivot arm.

In an embodiment, a method of opening a valve system comprises the steps (a) providing the valve system as discussed above; (b) operating a valve to a closed position to prevent flow from a pipeline; (c) rotating a gear to align a closure cap with a valve body opening; (d) aligning the closure cap with the valve body opening; (e) rotating a cap handle or hand wheel to lift the closure cap through the valve body opening; (f) lifting the closure cap through the valve body opening; (g) rotating a pivot arm to access an interior of the valve body; and (h) accessing the interior of the valve body.

In an embodiment, step b) comprises operating the valve to a closed position to remove a pig.

In an embodiment, step c) comprises rotating the gear until a stop plate touches a stop plate screw. In an embodiment, step c) comprises rotating the gear by a handle until a stop plate touches a stop plate screw.

In an embodiment, step g) comprises g-1) loosening a collar nut to rotate a pivot arm, and step g-2) comprises rotating the pivot arm to access the interior of the valve body. In an embodiment, step g) comprises g-1) loosening a collar nut to rotate a pivot arm, and step g-2) comprises rotating the pivot arm by pushing a handle to access the interior of the valve body.

In an embodiment, step h) comprises accessing the interior of the valve body to lift a received pig up through the valve body opening.

In an embodiment, a method of closing a valve system comprises the steps (a) providing the valve system as discussed above; (b) rotating a pivot arm to align a closure cap with a valve body opening; (c) aligning the closure cap with the valve body opening; (d) rotating a cap handle or a hand wheel to lower a closure cap through a valve body opening; (e) lowering the closure cap through the valve body opening; (f) rotating a gear to close the closure cap to the valve body; (g) closing the closure cap to the valve body; (h) operating the valve to an open position to permit flow from a pipeline.

In an embodiment, step b) comprises rotating the pivot arm until the pivot arm touches the pivot collar of the second pillar. In an embodiment, step b) comprises rotating the pivot arm by pulling a handle until the pivot arm touches the pivot collar of the second pillar. In an embodiment, step b) comprises b-1) rotating the pivot arm until the pivot arm touches a pivot collar of the second pillar, and b-2) tightening a collar nut to secure the pivot arm to the pivot collar of the second pillar. In an embodiment, step b) comprises b-1) rotating the pivot arm by pulling a handle until the pivot arm touches a pivot collar of the second pillar, and b-2) tightening a collar nut to secure the pivot arm to the pivot collar of the second pillar.

In an embodiment, step d) comprises rotating the hand wheel until a stop block touches an upper pivot arm plate.

In an embodiment, step f) comprises rotating the gear until a stop plate touches a stop screw. In an embodiment, step f) comprises rotating the gear by a handle until a stop plate touches a stop screw.

In an embodiment, step h) comprises automatically actuating or manually operating the valve to an open position to receive a pig.

In an embodiment, the method further comprises the step i) closing a bleed fitting and an equalizer valve. In an embodiment, step i) comprises i-1) inserting a lock plate into a bleed fitting, and i-2) closing an equalizer valve and the bleed fitting.

These and other objects, features and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present invention, reference should be made to the following detailed disclosure, taken in conjunction with the accompanying drawings, in which like parts are given like reference numerals, and wherein.

DETAILED DESCRIPTION OF EMBODIMENTS OF THE INVENTION

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

Valve System

Figure 1A:
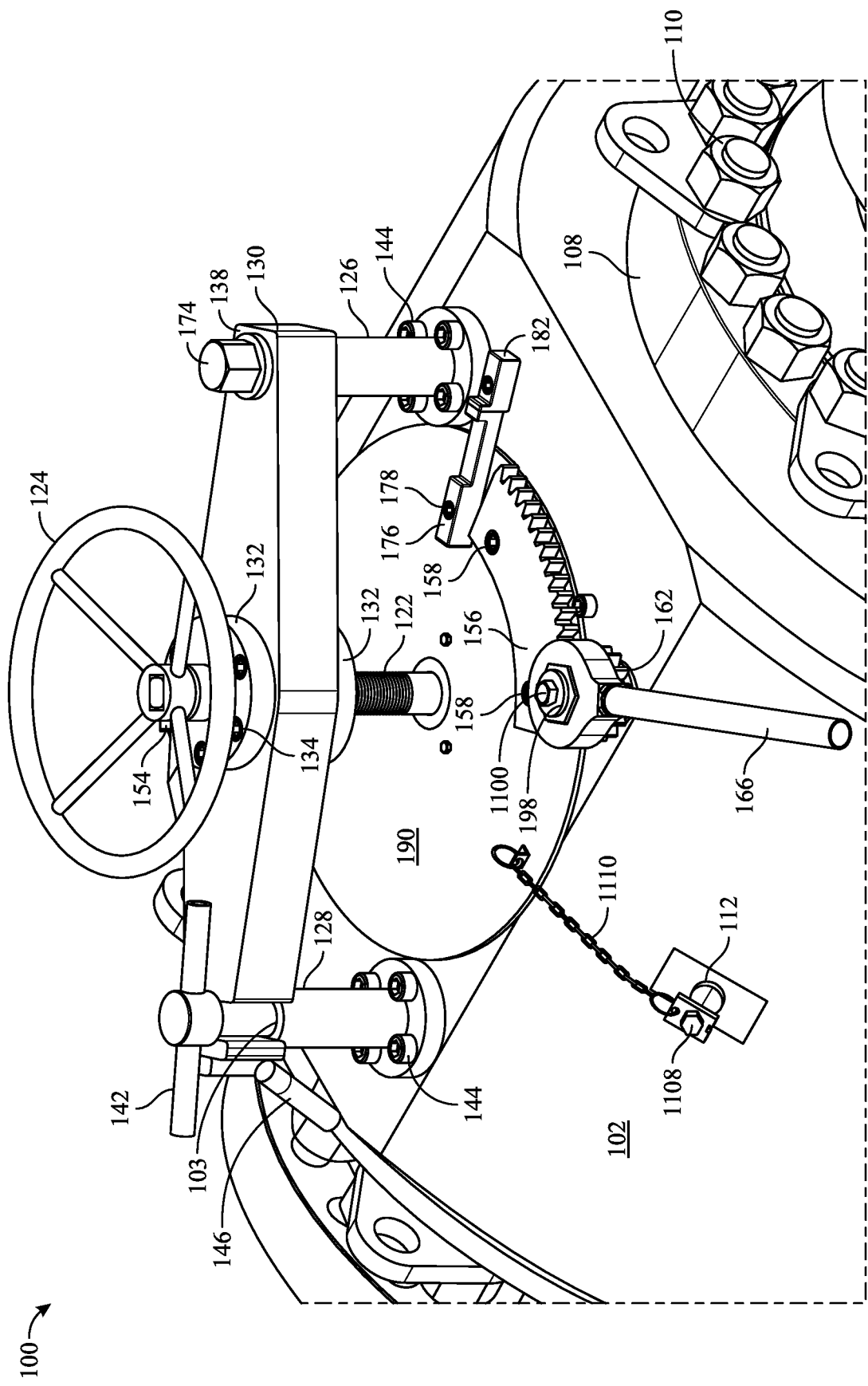
FIG. 1A illustrates an upper, right side perspective view of an improved valve system according to an embodiment of the present invention, showing a dual-pillar davit system and a gear and rack assembly for a closure cap.
Figure 1B:
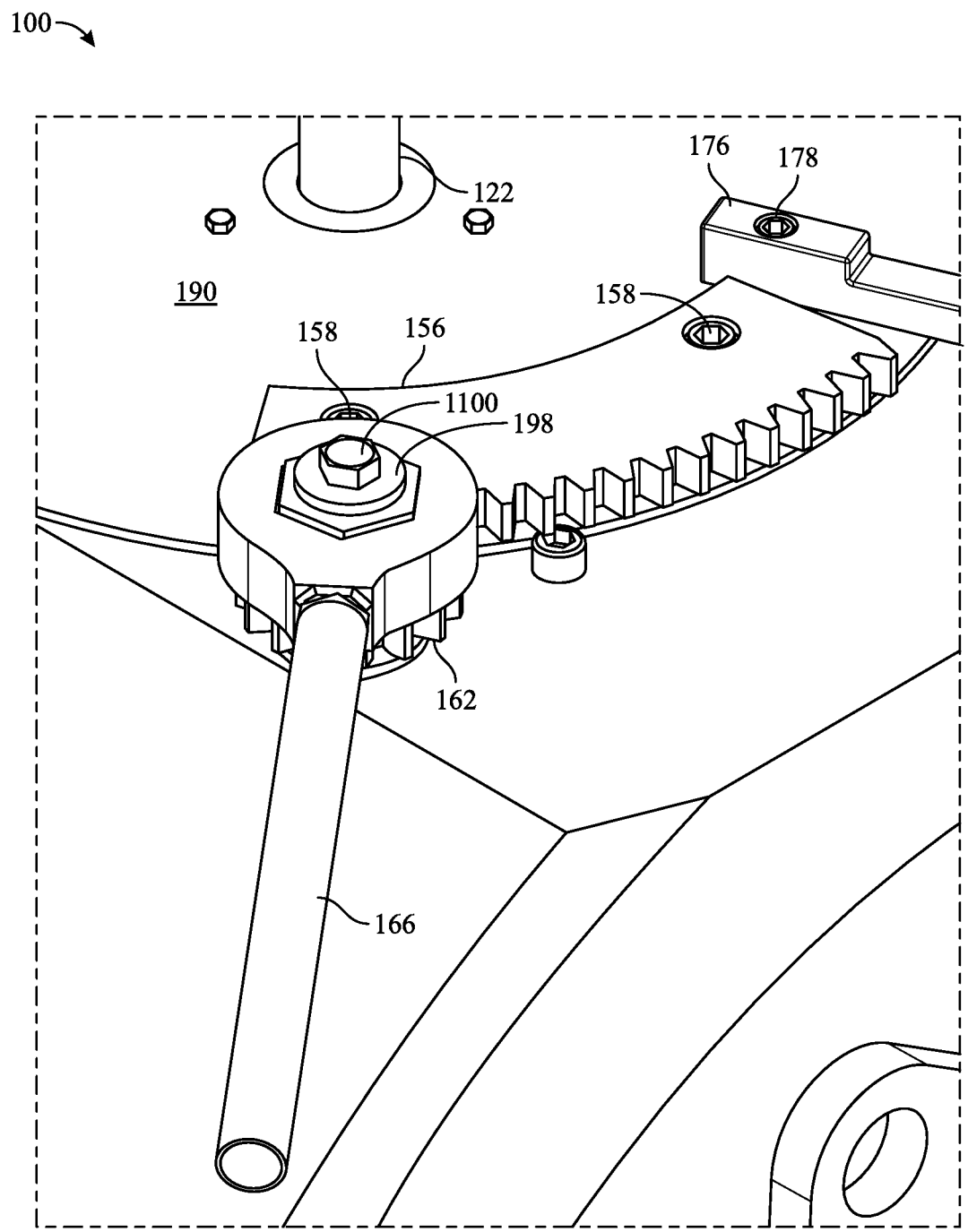
FIG. 1B illustrates a detailed view of the gear and rack assembly for the exemplary valve system of FIG. 1A.
Figure 1C:
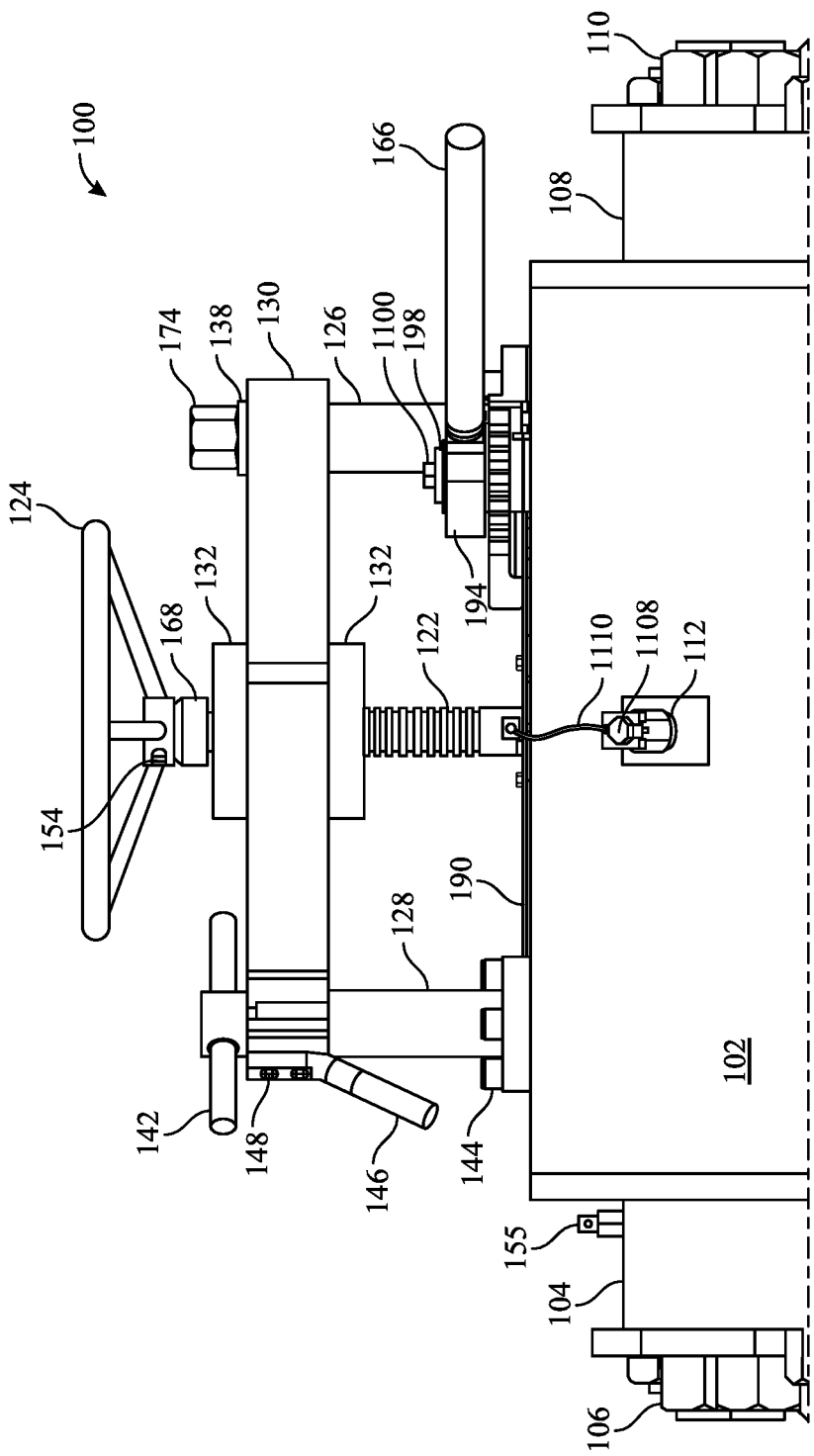
FIG. 1C illustrates a side view of the exemplary valve system of FIG. 1A, showing the dual-pillar davit system.

FIG. 1A illustrates an upper, right side perspective view of an improved valve system according to an embodiment of the present invention, showing a dual-pillar davit system and a gear and rack assembly for a closure cap; and FIG. 1B illustrates a detailed view of the gear and rack-level assembly for the exemplary valve system of FIG. 1A. FIG. 1C illustrates a side view of the exemplary valve system of FIG. 1A, showing the dual-pillar davit system.

Figure 2:
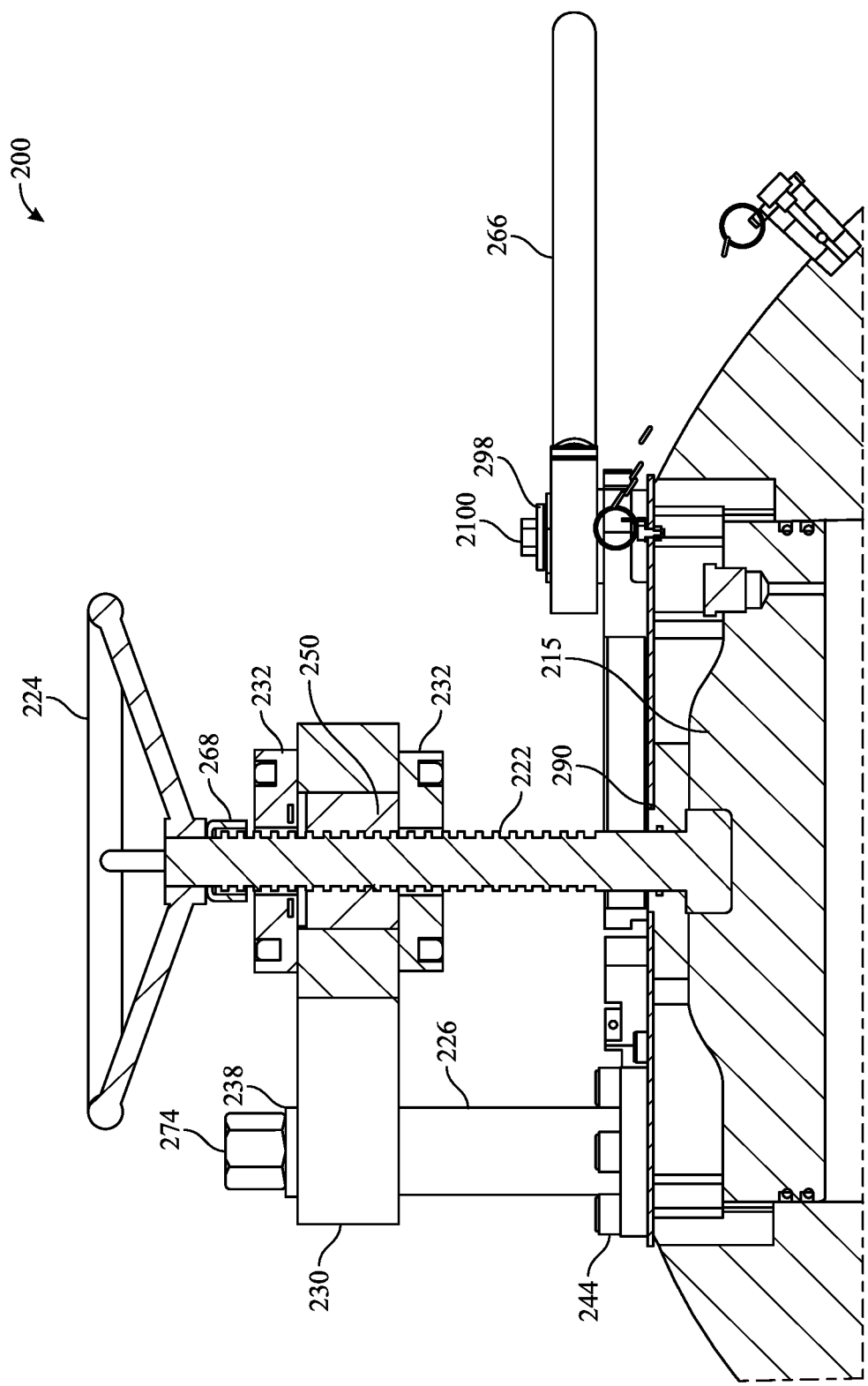
FIG. 2 illustrates a cross-sectional view of an exemplary valve system according to an embodiment of the present invention.

FIG. 2 illustrates a cross sectional view of an exemplary valve system according to an embodiment of the present invention.

Figure 3A:
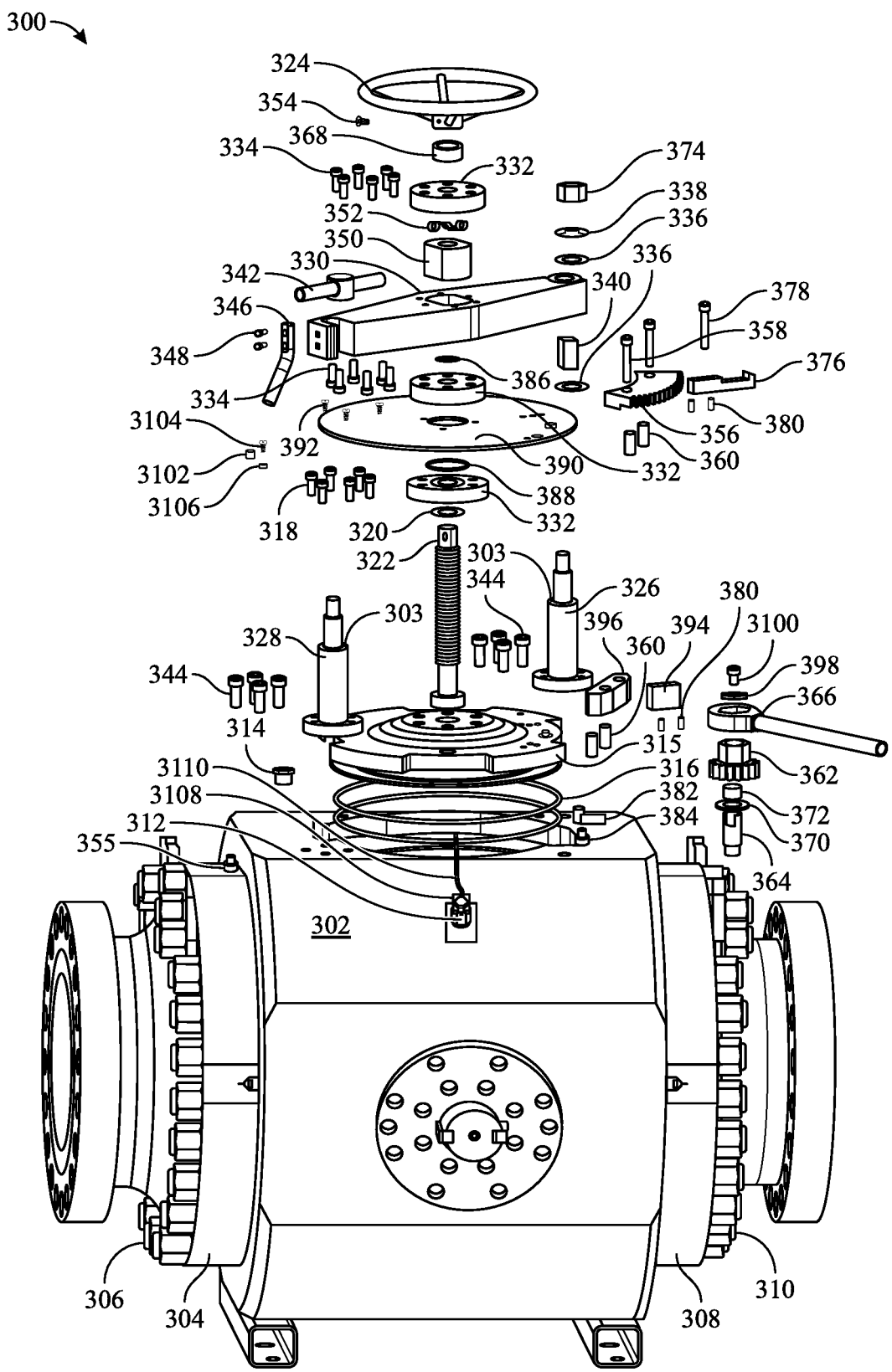
FIG. 3A illustrates an exploded view of an exemplary valve system according to an embodiment of the present invention, showing a dual-pillar system and a threadless closure cap.
Figure 3B:
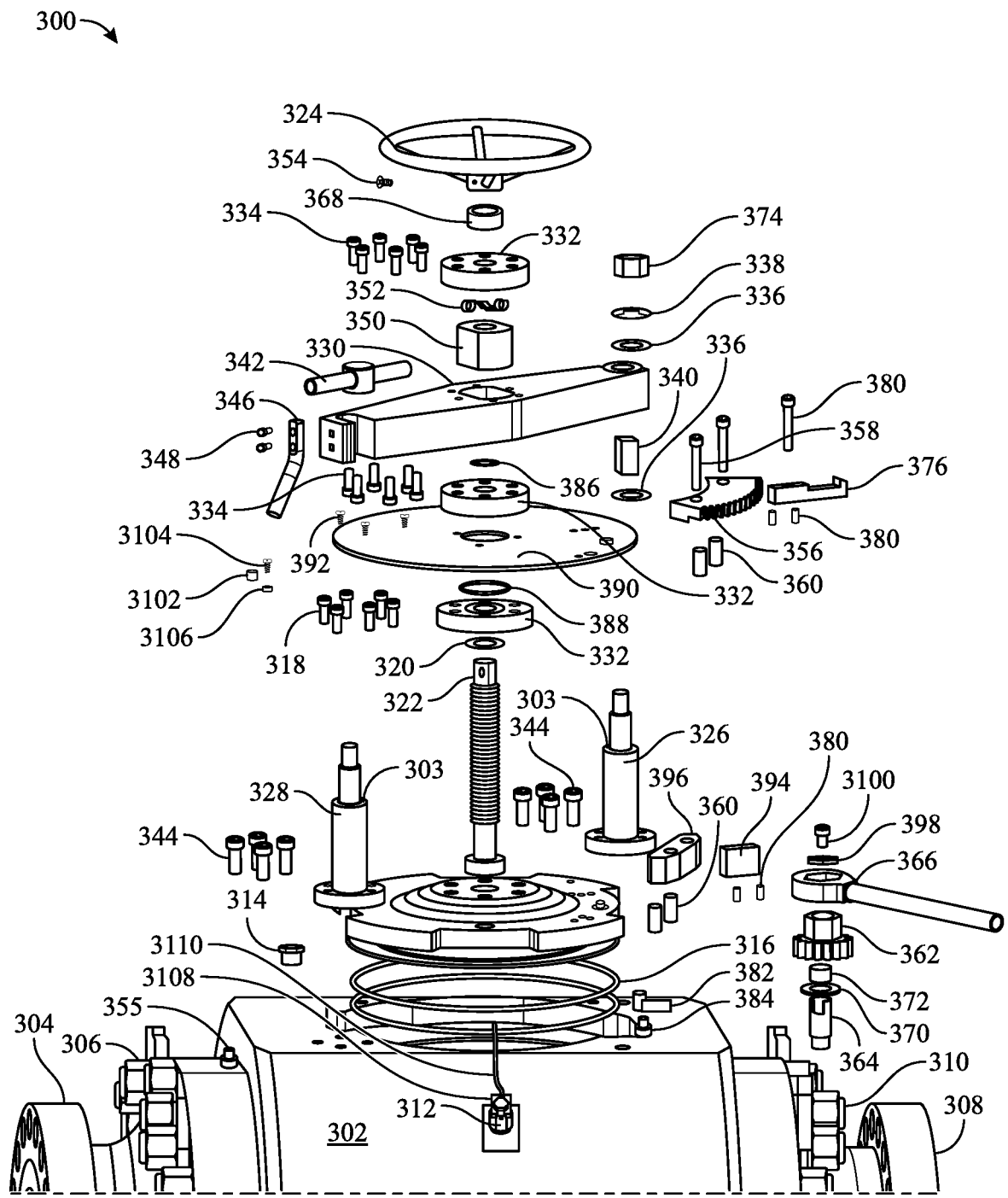
FIG. 3B illustrates a detailed view of the dual pillar and threadless closure cap for the exemplary valve system of FIG. 3A.

FIG. 3A illustrates an exploded view of an exemplary valve system according to an embodiment of the present invention, showing a dual-pillar system and a threadless closure cap; and FIG. 3B illustrates a detailed view of the dual pillar and a threadless closure cap system for the exemplary valve system of FIG. 3A.

As shown in FIGS. 1A-1C and 2-3B, the valve system 100, 200, 300 comprises a valve body 102, 302 having an opening and an interior, and a closure cap 190, 290, 390. In an embodiment, the valve body 102, 302 opening may be shaped to accommodate the closure cap 215, 315. In an embodiment, the closure cap 215, 315 may have a plurality of extensions, as discussed below.

In an embodiment, the closure cap 215, 315 may be a threadless closure cap.

In an embodiment, the valve system 100, 200, 300 may be operated to a closed position or to an open position. Automatic or manual operation of valves from an open position to a closed position or vice versa is well known in the art. In an embodiment, the valve system 100, 200, 300 may be closed to prevent flow from, for example, a pipeline or other equipment. In an embodiment, if the valve system 100, 200, 300 is a pigging valve, the valve system 100, 200, 300 may be closed to remove a received pig.

In an embodiment, the valve body 102, 302 has a first end and a second end, wherein the first end of the valve body 102, 302 may be fluidly connected to a first adapter or connection pipe 104, 304 via a first fastener system 106, 306 and the second end of the valve body 102, 302 may be fluidly connected to a second adapter or connection pipe 108, 308 via a second fastener system 110, 310. Fasteners are well known in the art. In an embodiment, the first adapter or connection pipe 104, 304 may be connected to a pipeline or other equipment; and the second adapter or connection pipe 108, 308 may be connected to a pipeline or other equipment.

In an embodiment, the first adapter or connection pipe 104, 304 may further comprise an optional equalizer valve assembly 155, 355 disposed through a wall of the first adapter or connection pipe 104, 304; and/or the second adapter or connection pipe 108, 308 may further comprise an optional equalizer valve assembly 155, 355 disposed through a wall of the second adapter or connection pipe 108, 308.

Figure 4A:
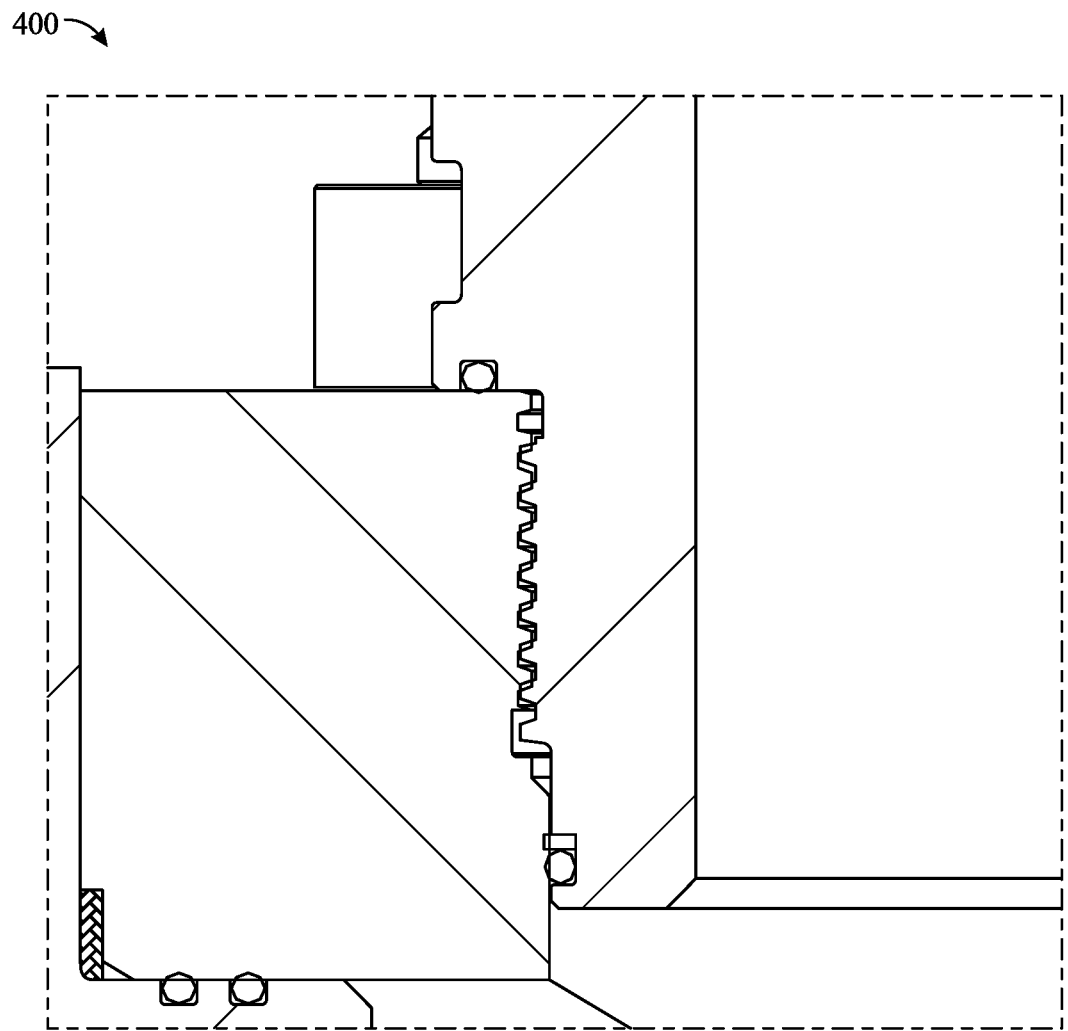
FIG. 4A illustrates a cross-sectional view of a trapezoidal thread connection between a valve body and a connection pipe for an exemplary valve system according to an embodiment of the present invention.

FIG. 4A illustrates a cross-sectional view of a trapezoidal thread connection between a valve body 102, 302 and an adapter or connection pipe 104, 108, 304, 308 for an exemplary valve system according to an embodiment of the present invention.

Means for Sealing Closure Cap

In an embodiment, the valve system 100, 200, 300 further comprises a means for sealing the closure cap 215, 315. In an embodiment, the means for sealing the closure cap may comprise a closure cap O-ring 316. O-rings are well known in the art. For example, the closure cap O-ring 316 may be disposed between the closure cap 215, 315 and the valve body 102, 302 when the closure cap 215, 315 is in a closed position.

In an embodiment, the valve body 102, 302 and the closure cap 215, 315 may be connected via a threadless connection to hold the closure cap 215, 315 in place under pressure. For example, a cap-to-clamp type connection may be used to hold the closure cap 215, 315 in place under pressure. In an embodiment, a closure cap 215, 315 may have a plurality of extensions. As shown in FIGS. 3A-3B, the closure cap 315 may have four extensions.

In an embodiment, the extensions of the closure cap 215, 315 may be rotated to be disposed within a clamp in the valve body 102, 302. For example, the four extensions of the closure cap 215, 315 may be rotated a quarter turn to be disposed with the four clamps in the valve body 102, 302, as shown in FIGS. 3A-3B and 4B.

Figure 4B:
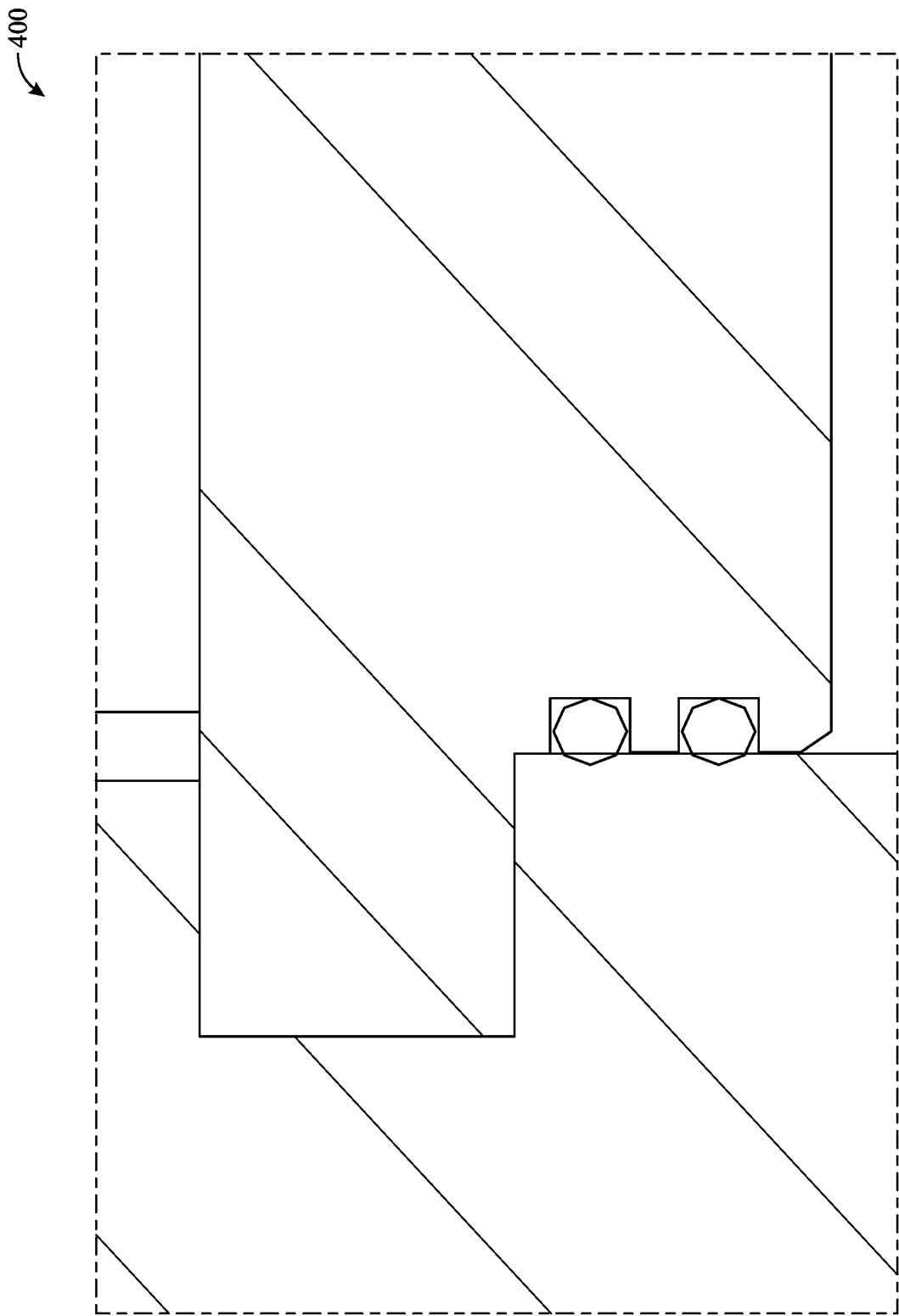
FIG. 4B illustrates a cross-sectional view of a cap-to-clamp type connection between a valve body and a threadless closure cap for an exemplary valve system according to an embodiment of the present invention, showing a pair of closure cap O-rings.

FIG. 4B illustrates a cross-sectional view of a cap-to-clamp type connection between a valve body 102, 303 and a closure cap 215, 315 for an exemplary valve system in a closed position according to an embodiment of the present invention, showing a pair of closure cap O-rings and a single cap-to-clamp connection.

Figure 4C:
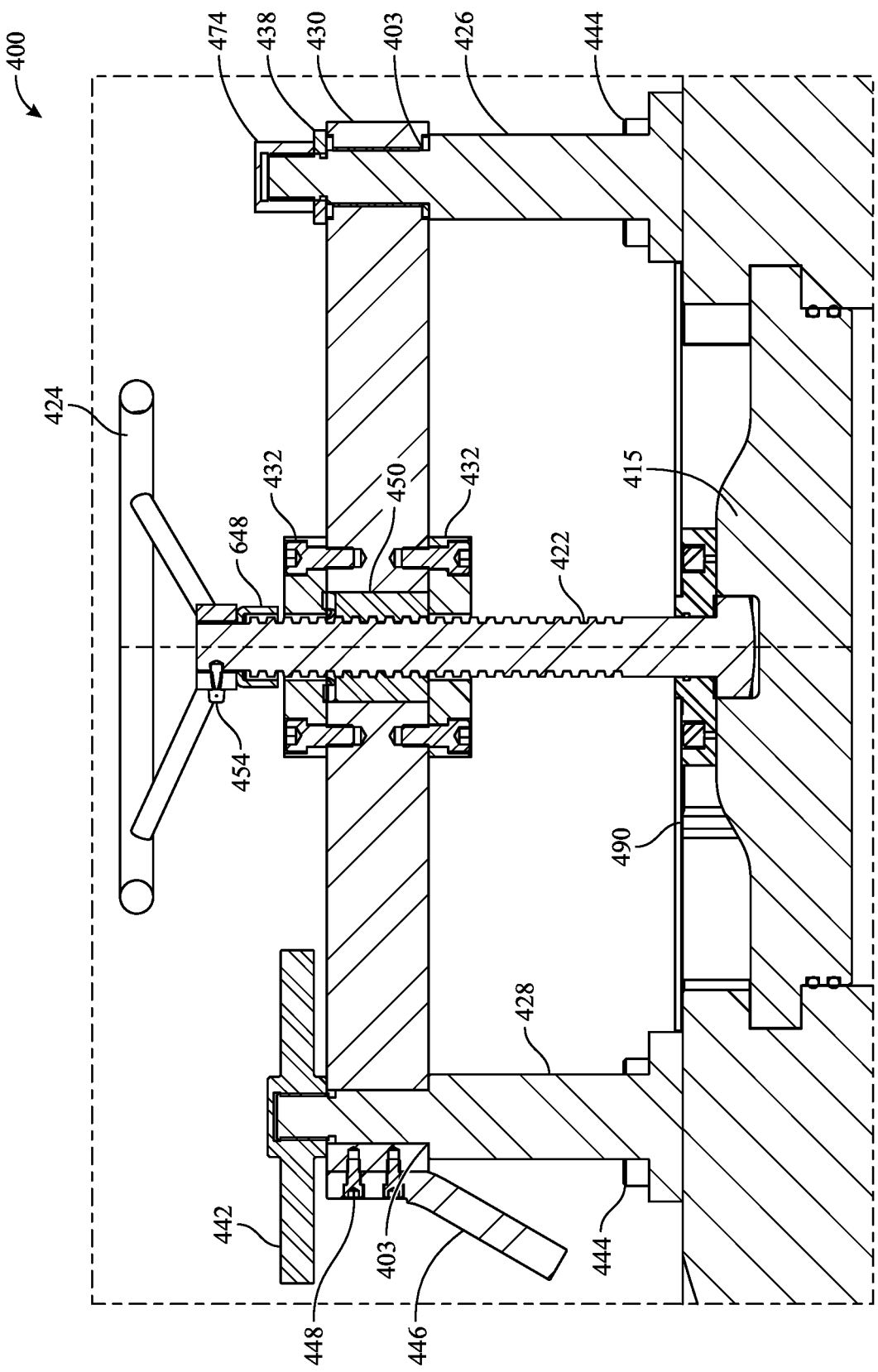
FIG. 4C illustrates a detailed, cross-sectional view of a dual-pillar davit system for an exemplary valve system according to an embodiment of the present invention.

FIG. 4C illustrates a detailed, cross-sectional view of a dual-pillar davit system for an exemplary valve system according to an embodiment of the present invention.

Means for Rotating the Closure Cap

In an embodiment, the valve system 100, 200, 300, 400 further comprises a means for rotating the closure cap 215, 315, 415 from an open position to a closed position or, alternatively, from the closed position to the open position.

In an embodiment, the means for rotating the closure cap 215, 315, 415 may comprise a gear and rack assembly. In an embodiment, the means for rotating the closure cap may comprise a rack 156, 356 having rack teeth, a gear 162, 362 having an upper end and a lower end and gear teeth on an outer surface, and a gear screw 364 having an upper end and a lower end, wherein the rack teeth and gear teeth may be adapted to engage each other.

In an embodiment, the rack 156, 356 may be attached to an upper surface of the closure cap 215, 315, 415 or cover plate 190, 390, 490 adjacent to the valve body 102, 302 opening via a fastener. Fasteners are well known in the art. For example, the rack 156, 356 may be attached to an upper surface of the closure cap 215, 315, 415 or cover plate 190, 390, 415 adjacent to the valve body 102, 302 opening via a rack screw 158, 358.

In an embodiment, the gear 162, 362 may be attached to the upper end of the gear screw 364 via a fastener. Fasteners are well known in the art.

In an embodiment, the gear screw may be disposed through the valve body adjacent to the rack and the valve body opening.

In an embodiment, the closure cap 215, 315, 415 may be attached to the lower end of the gear screw 364 via a fastener. Fasteners are well known in the art.

In an embodiment, the means for rotating the closure cap 215, 315, 415 may further comprise a gear bearing 372. In an embodiment, the gear bearing 372 may be disposed between the gear 162, 362 and the upper end of the gear screw 364.

In an embodiment, the means for rotating the closure cap 215, 315, 415 may further comprise a gear washer 370. Washers are well known in the art. For example, the gear washer 370 may be disposed between the gear bearing 372 and the valve body 102, 302.

In an embodiment, the means for rotating the closure cap 215, 315, 415 may further comprise a hand wrench adapted to fit the upper end of the gear 162, 362.

In an embodiment, the means for rotating the closure cap 215, 315, 415 may further comprise a gear handle 166, 266, 366 having a first end and a second end, wherein the first end may be adapted to fit the upper end of the gear 162, 362.

In an embodiment, the gear handle 166, 266, 366 may be attached to the gear 162, 362 via a fastener. Fasteners are well known in the art. For example, the gear handle 166, 266, 366 may be attached to the gear 162, 362 via a gear screw 1100, 3100.

In an embodiment, the means for rotating the closure cap 215, 315, 415 may further comprise a gear washer 198, 398. Washers are well known in the art. For example, the gear washer 198, 398 may be disposed between the gear screw 1100, 3100 and the gear 162, 362.

In an embodiment, the means for rotating the closure cap 215, 315, 415 may further comprise a stop plate 176, 376 having an inner end and an outer end. In an embodiment, the stop plate 176, 376 may be attached to an upper surface of a cover plate 190, 390, 490 or the closure cap 215, 315 adjacent to the rack 156, 356 and the valve body 102, 302 opening via a fastener. Fasteners are well known in the art.

For example, the stop plate 176, 376 may be attached to an upper surface of a cover plate 190, 390, 490 or the closure cap 215, 315, 415 adjacent to the rack 156, 356 and the valve body 102, 302 opening via a stop plate screw 178, 378.

In an embodiment, the means for rotating the closure cap 215, 315, 415 may further comprise a stop plate pin 380. Pins are well known in the art. For example, one or more stop plate pins 380 may be used between the cover plate 190, 390, 490 or closure cap 215, 315, 415 and the stop plate 176, 376 to prevent the stop plate 176, 376 from rotating about the stop plate screw 178, 378.

In an embodiment, the means for rotating the closure cap 215, 315, 415 may further comprise a lock plate 182, 382. In an embodiment, the lock plate 182, 382 may be attached to an upper surface of the valve body 102, 302 adjacent to the outer end of the stop plate 176, 376 and the valve body 102, 302 opening via a fastener. Fasteners are well known in the art. For example, the lock plate 182, 382 may be attached to an upper surface of the valve body 102, 302 adjacent to the outer end of the stop plate 176, 376 and the valve body 102, 302 opening via a lock plate screw.

In an embodiment, the means for rotating the closure cap 215, 315, 415 may further comprise a lock plate pin (not shown). Pins are well known in the art. For example, one or more lock plate pins (not shown) may be used between the valve body 102, 302 and the lock plate 182, 382 to prevent the lock plate 182, 382 from rotating about the lock plate screw.

Alternatively, the means for rotating the closure cap 215, 315, 415 may comprise a horizontal handle attached to the upper surface of the closure cap 215, 315, 415.

Optional Cover Plate or Closure Cap Lock Plate System

In an embodiment, the valve system 100, 200, 300, 400 may further comprise a lock plate system. In an embodiment, the valve system 100, 200, 300, 400 may further comprise a bleed fitting 112, 312 and a lock plate 1108, 3108 connected to the cover plate 190, 390, 490 or the closure cap 215, 315 via a mechanical connection. Mechanical connections are well known in the art. For example, a chain assembly may be used to connect a lock plate 1108, 3108 and the cover plate 190, 390, 490 and/or the lock plate 1108, 3108 and the closure cap 215, 315, 415.

In an embodiment, the bleed fitting 112, 312 may be disposed through a wall of the valve body 102, 302.

Dual-Pillar Davit System

In an embodiment, the valve system 100, 200, 300, 400 further comprises a dual-pillar davit system as shown in FIGS. 1A-1B, 2-3B and 4C. In an embodiment, the dual-pillar davit system comprises a first pillar 126, 226, 326, 426 having an upper and a lower end, a second pillar 128, 328, 428 having an upper and a lower end, a pivot arm 130, 230, 330, 430 having a first end and a second end. In an embodiment, the lower end of the first pillar 126, 226, 326, 426 may be attached to an upper surface of the valve body 102, 302 via a fastener and the lower end of the second pillar 128, 328, 428 may be attached to an upper surface of the valve body 102, 302 via a fastener. Fasteners are well known in the art. For example, the lower end of the first pillar 126, 226, 326, 426 may be attached to an upper surface of the valve body 102, 302 via collar screws 144, 244, 344, 444 and the lower end of the second pillar 128, 328, 428 may be attached to an upper surface of the valve body 102, 302 via collar screws 144, 244, 344, 444. Screws and other fasteners are well known in the art.

In an embodiment, the first pillar 126, 226, 326, 426 may be stationary, and the second pillar 128, 328, 428 may be dynamic 1) to align the closure cap 215, 315, 415 to the valve body 102, 302 opening, and 2) to control the forces as the closure cap 215, 315, 415 may be lifted.

In an embodiment, the first end of the pivot arm 130, 230, 330, 430 may be rotationally attached to the upper end of the first pillar 126, 226, 326, 426 and the second end of the pivot arm 130, 230, 330, 430 may be removably attached to the upper end of the second pillar 128, 328, 428, wherein the pivot arm 130, 230, 330, 430 straddles the valve body 102, 302 opening.

In an embodiment, the first end of the pivot arm 130, 230, 330, 430 may be adapted to touch the upper end of the first pillar 126, 226, 326, 426. For example, the first end of the pivot arm 130, 230, 330, 430 may be adapted to touch a pivot collar 103, 303, 403 of the first pillar 126, 226, 326, 426.

In an embodiment, the first end of the pivot arm 130, 230, 330, 430 may be rotationally attached to the upper end of the first pillar 126, 226, 326, 426 via a fastener and a bearing assembly. Fasteners and bearings are well known in the art. For example, the upper end of the first pillar 126, 226, 326, 426 may be adapted to accept a cap nut 174, 274, 374, 474 and a pivot arm bearing 340. In this example, the collar nut 142, 242, 342, 442 and the pivot arm bearing 340 rotationally attaches the first end of the pivot arm 130, 230, 330, 430 against the upper end and/or pivot collar 103, 203, 303, 403 of the first pillar 126, 226, 326, 426. In an embodiment, the fastener and bearing assembly further comprises a washer 338, an upper collar thrust bearing 336, and a lower collar thrust bearing 336, as shown in FIGS. 3A-3B.

In an embodiment, the second end of the pivot arm 130, 230, 330, 430 may be adapted to touch the upper end of the second pillar 128, 328, 428. For example, the second end of the pivot arm 130, 230, 330, 430 may be adapted to touch a pivot collar 103, 303, 303 of the second pillar 128, 328, 428.

In an embodiment, the second end of the pivot arm 130, 230, 330, 430 may be removably attached to the upper end of the second pillar 128, 328, 428 via a fastener. Fasteners are well known in the art. For example, the upper end of the second pillar 128, 328, 428 may be adapted to accept a collar nut 142, 342, 442. In this example, the collar nut 142, 342, 442 removably attaches the second end of the pivot arm 130, 230, 330, 430 against the upper end and/or the pivot collar 103, 303, 403 of the second pillar 128, 328, 428.

In an embodiment, the second end of the pivot arm 130, 230, 330, 430 may further comprise a pivot arm handle 146, 346, 446 for rotating the pivot arm 130, 230, 330, 430 about the first pillar 126, 226, 326, 426. In an embodiment, the pivot arm handle 146, 346, 446 may be attached to the second end of the pivot arm 130, 230, 330, 430 via a fastener. Fasteners are well known in the art. In an embodiment, the pivot arm handle 146, 346, 446 may be attached to the second end of the pivot arm 130, 230, 330, 430 via pivot arm handle screws 148, 348, 448. In an embodiment, the pivot arm handle 146, 346, 446 may be used when rotating the pivot arm 130, 230, 330, 430 away from straddling the valve body opening.

In an embodiment, the dual-pillar davit system further comprises a closure cap 215, 315, 415 adapted to seal the valve body 102, 302 opening, a cap stem 122, 222, 322, 422 having an upper end and a lower end, and a cap handle or hand wheel 124, 224, 324, 424.

In an embodiment, the upper end of the cap stem 122, 222, 322, 422 may be disposed through a central portion of the pivot arm 130, 230, 330, 430.

In an embodiment the cap handle or hand wheel 124, 224, 324, 424 may be attached to the upper end of the cap stem 122, 222, 322, 422 via a fastener. Fasteners are well known in the art. For example, the cap handle or hand wheel 124, 224, 324, 424 may be attached to the upper end of the cap stem 122, 222, 322, 422 via a cap handle or hand wheel screw 154, 254, 354, 454. In this example, the cap handle or hand wheel screw 154, 254, 354, 454 may prevent the cap handle or hand wheel 154, 254, 354, 454 from rotating on the cap stem 122, 222, 322, 422.

In an embodiment, the closure cap 215, 315, 415 may be attached to a lower end of the cap stem 122, 222, 322, 422 via a fastener. Fasteners are well known in the art. For example, the closure cap 215, 315, 415 may be attached to a lower end of the cap stem 122, 222, 322, 422 via screws. Alternatively, the lower end of the cap stem 122, 222, 322, 422 may screw into the closure cap 215, 315, 415.

Means for Lifting and Lowering a Closure Cap

In an embodiment, the dual-pillar davit system further comprises a means for lifting and lowering the closure cap 215, 315, 415. In an embodiment, the means for lifting and lowering the closure cap may comprise a threaded cap stem 122, 222, 322, 422, an upper and a lower pivot arm plate 132, 232, 332, 432 attached to the pivot arm 130, 230, 330, 430, and a cap stem nut 250, 350, 450.

In an embodiment, the upper end of the threaded cap stem 122, 222, 322, 422 may be disposed through a central portion of the pivot arm 130, 230, 330, 430.

In an embodiment, the upper and lower pivot arm plates 132, 232, 332, 432 may be attached to the pivot arm 130, 230, 330, 430 via fasteners. Fasteners are well known in the art. For example, the upper pivot arm plate 132, 232, 332, 432 may be attached to the pivot arm 130, 230, 330, 430 via screws 134, 334, 434; the lower pivot arm plate 132, 232, 332, 432 may be attached to the pivot arm via screws 134, 334, 434.

In an embodiment, the means for lifting and lowering a closure cap 215, 315, 415 may further comprise a stop block 168, 268, 368, 468 disposed between the cap handle or hand wheel 124, 224, 324, 424 and the upper pivot arm plate 132, 232, 332, 432.

In an embodiment, the means for lifting and lowering a closure cap 215, 315, 415 may further comprise a spring 352 disposed between the upper pivot arm plate 132, 232, 332, 432 and the cap stem nut 250, 350, 450. In an embodiment the spring 352 may be a waveform spring. Springs are well known in the art.

Figure 4D:
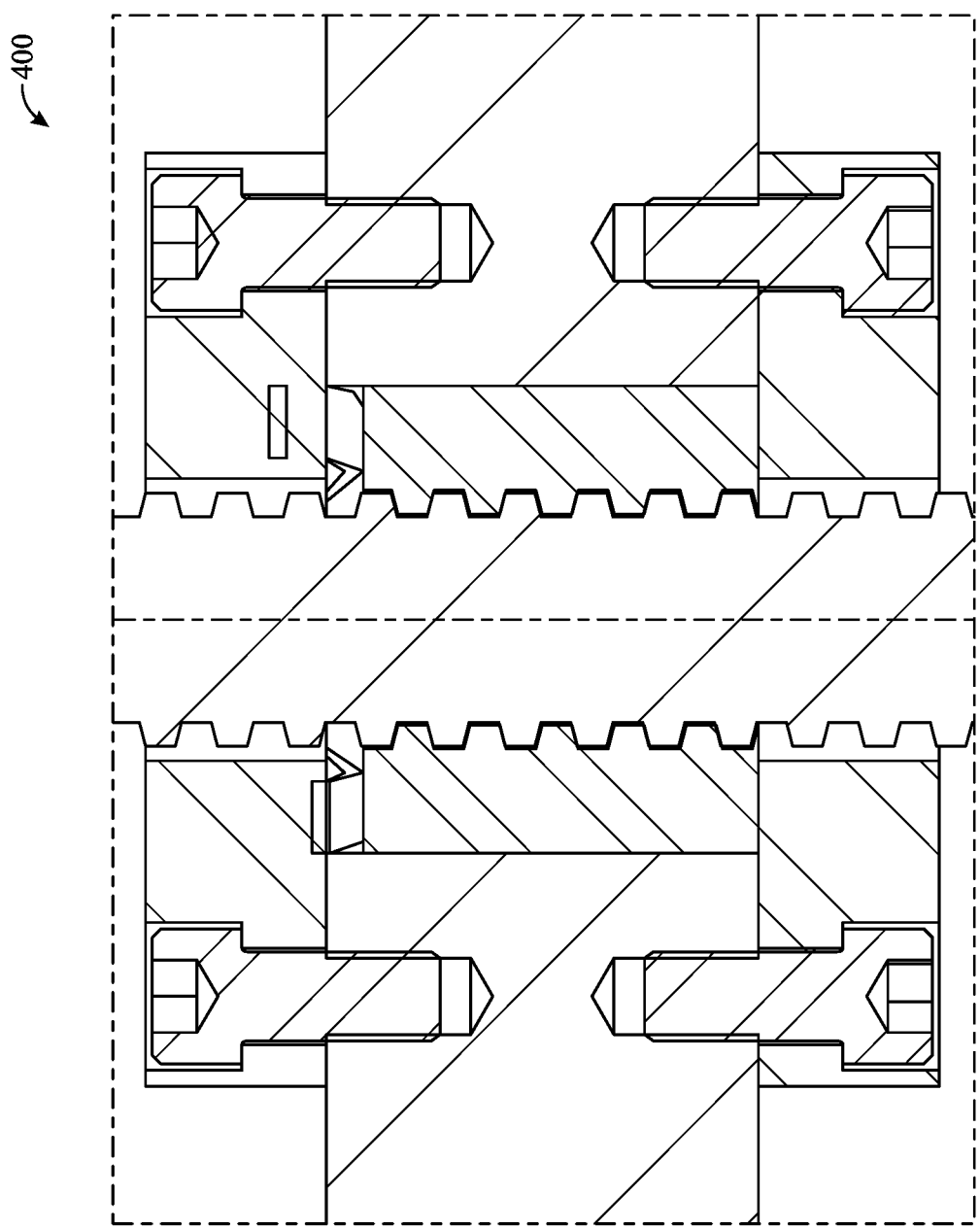
FIG. 4D illustrates a detailed, cross-sectional view of a cap nut block and a waveform spring assembly for an exemplary valve system according to an embodiment of the present invention.

FIG. 4D illustrates a detailed, cross-sectional view of a cap nut block and waveform spring assembly for an exemplary valve system according to an embodiment of the present invention.

In an embodiment, the means for lifting and lowering a closure cap 215, 315, 415 may further comprise a cap plate O-ring 386 disposed between the pivot arm 130, 230, 330, 430 and the lower pivot plate 132, 232, 332, 432. O-rings are well known in the art.

In an embodiment, the means for lifting and lowering a closure cap may further comprise a cover plate 190, 290, 390, 490, an upper cap plate thrust bearing 388, a lower, lower pivot arm plate 332, and a lower cap stem thrust bearing 320.

In an embodiment, the upper cap plate thrust bearing 388 may be disposed between the cover plate 190, 290, 390, 490 and the lower, lower pivot arm plate 332.

In an embodiment, the lower cap stem thrust bearing 320 may be disposed between the lower, lower pivot arm plate 332 and a collar of the cap stem 122, 222, 322, 422.

Alternatively, the means for lifting and lowering the closure cap 215, 315, 415 may comprise a jack assembly disposed between the pivot arm 130, 230, 330, 430 and the cap handle or hand wheel 124, 224, 324, 424. In an embodiment, the jack assembly comprises a slotted jack stem having an upper end and a lower end, and a jack system adapted to lower or raise the closure cap by engaging a slot in the jack stem 122, 222, 322, 422. In an embodiment, the upper end of the jack stem may be attached to the cap handle or hand wheel 124, 224, 324, 424 via fasteners; the lower end of the jack stem may be attached to the pivot arm 130, 230, 330, 430 via fasteners. Fasteners are well known in the art.

Figure 5A:
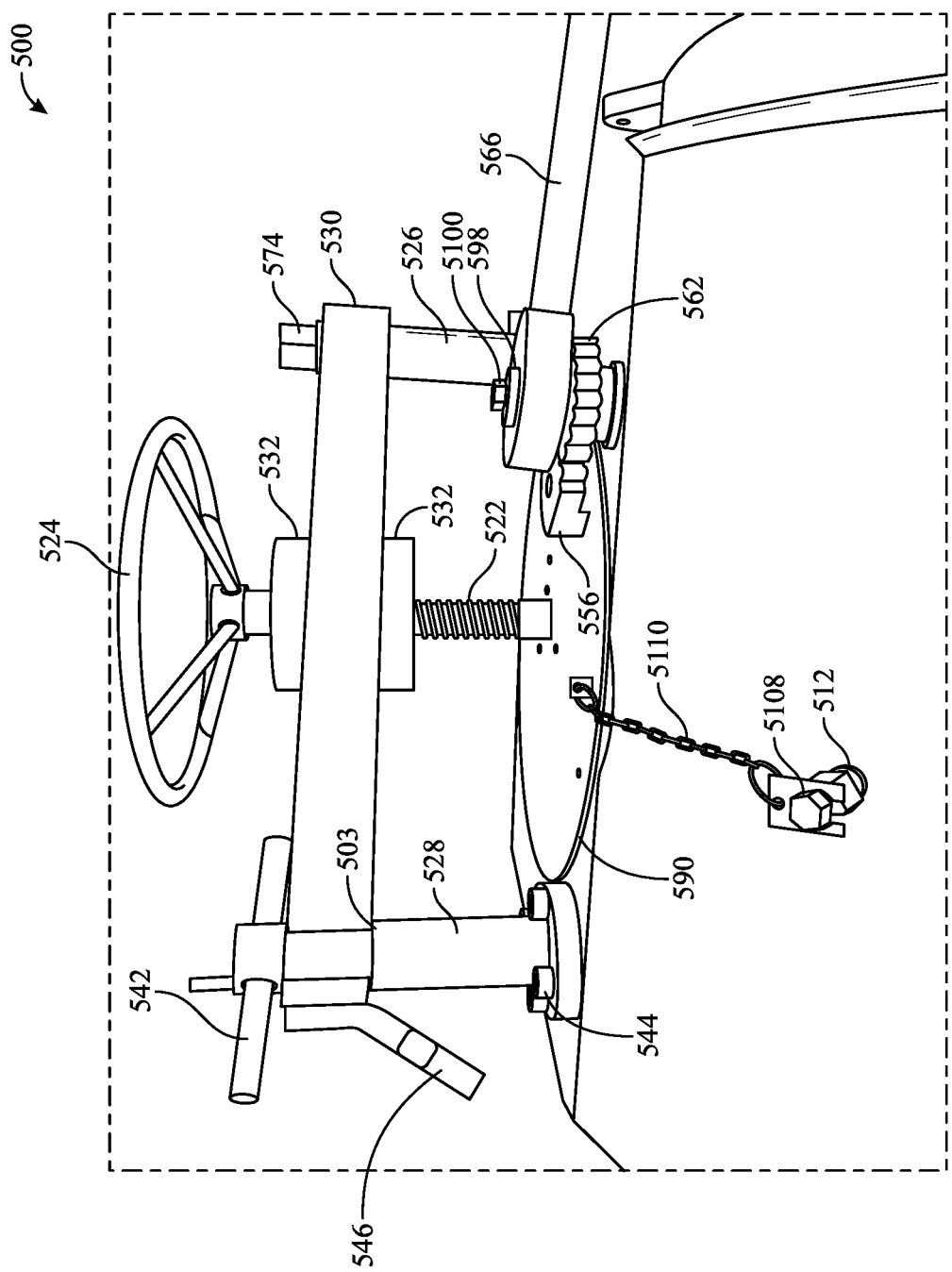
FIG. 5A illustrates a photograph of a dual-pillar davit system for an exemplary valve system according to an embodiment of the present invention.
Figure 5B:
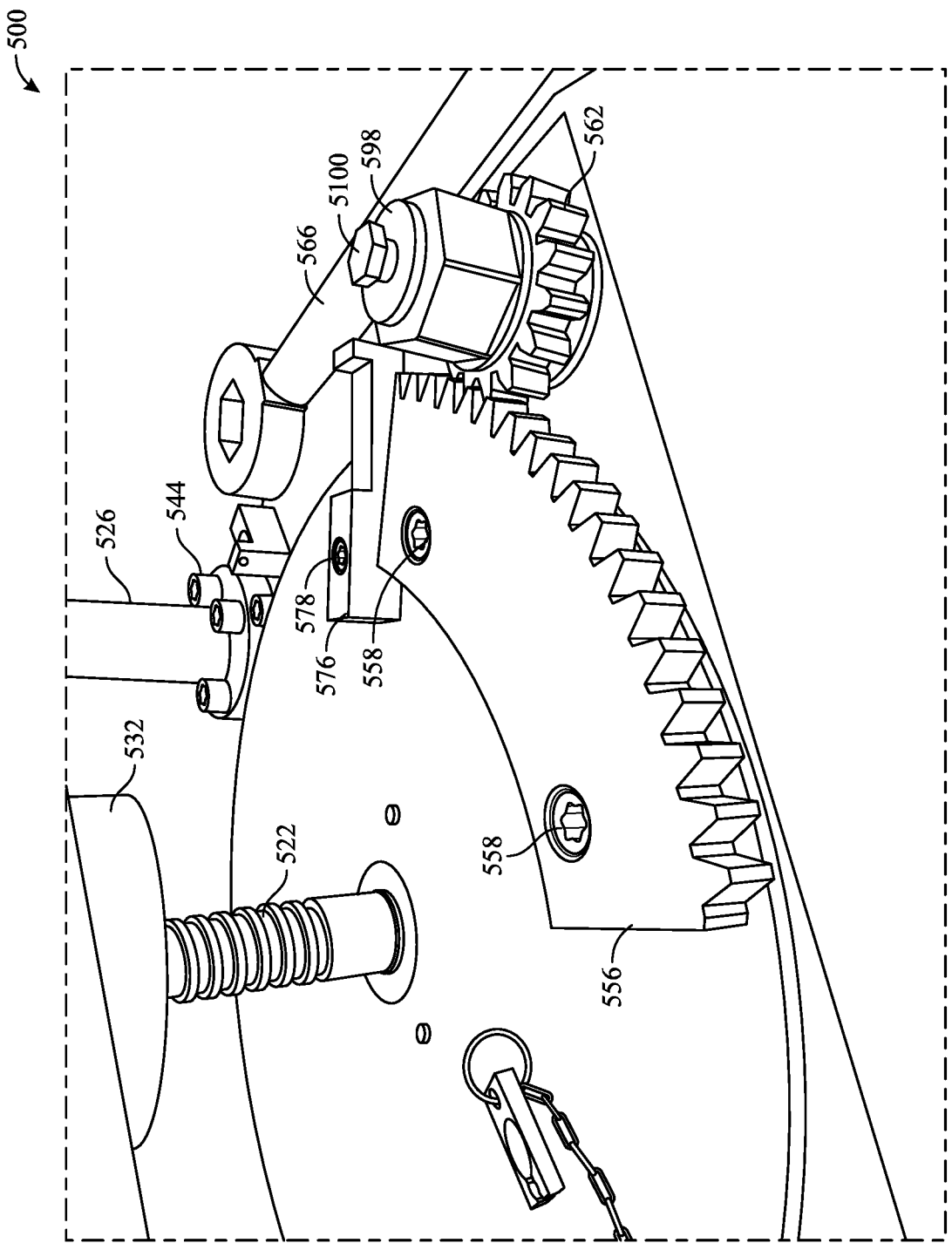
FIG. 5B illustrates a close-up photograph of a gear and rack-level assembly for the exemplary valve system of FIG. 5A.

FIG. 5A illustrates a photograph of a dual-pillar davit system for an exemplary valve system according to an embodiment of the present invention; and FIG. 5B illustrates a close-up photograph of a gear and rack assembly for the exemplary valve system of FIG. 5A.

As shown in FIG. 5A, the valve system 500 comprises a dual-pillar davit system. In an embodiment, the dual-pillar davit system comprises a first pillar 526, a second pillar 528, and a pivot arm 530. In an embodiment, the dual pillar system may further comprise a cap handle or hand wheel 524, a pivot arm plate 532, and a cap stem 522. In an embodiment, the dual-pillar davit system may further comprise a pivot collar 503, a collar nut 542, a collar screw 544, a pivot arm handle 546, and a cap nut 574.

In an embodiment, the valve system 500 may further comprise a lock plate system. In an embodiment, the lock plate system comprises a bleed fitting 512, a lock plate 5108 and a chain assembly 5110.

As shown in FIGS. 5A-5B, the valve system 500 comprises a gear and rack assembly. In an embodiment, the gear and rack assembly comprises a rack 556, a rack screw 558, and a gear 562. In an embodiment, the gear and rack assembly may further comprise a gear handle 566, a gear washer 598 and a gear screw 5100.

In an embodiment, the gear and rack assembly may further comprise a stop plate 576 and a stop plate screw 578.

Method of Using an Exemplary Valve System

Figure 6A:
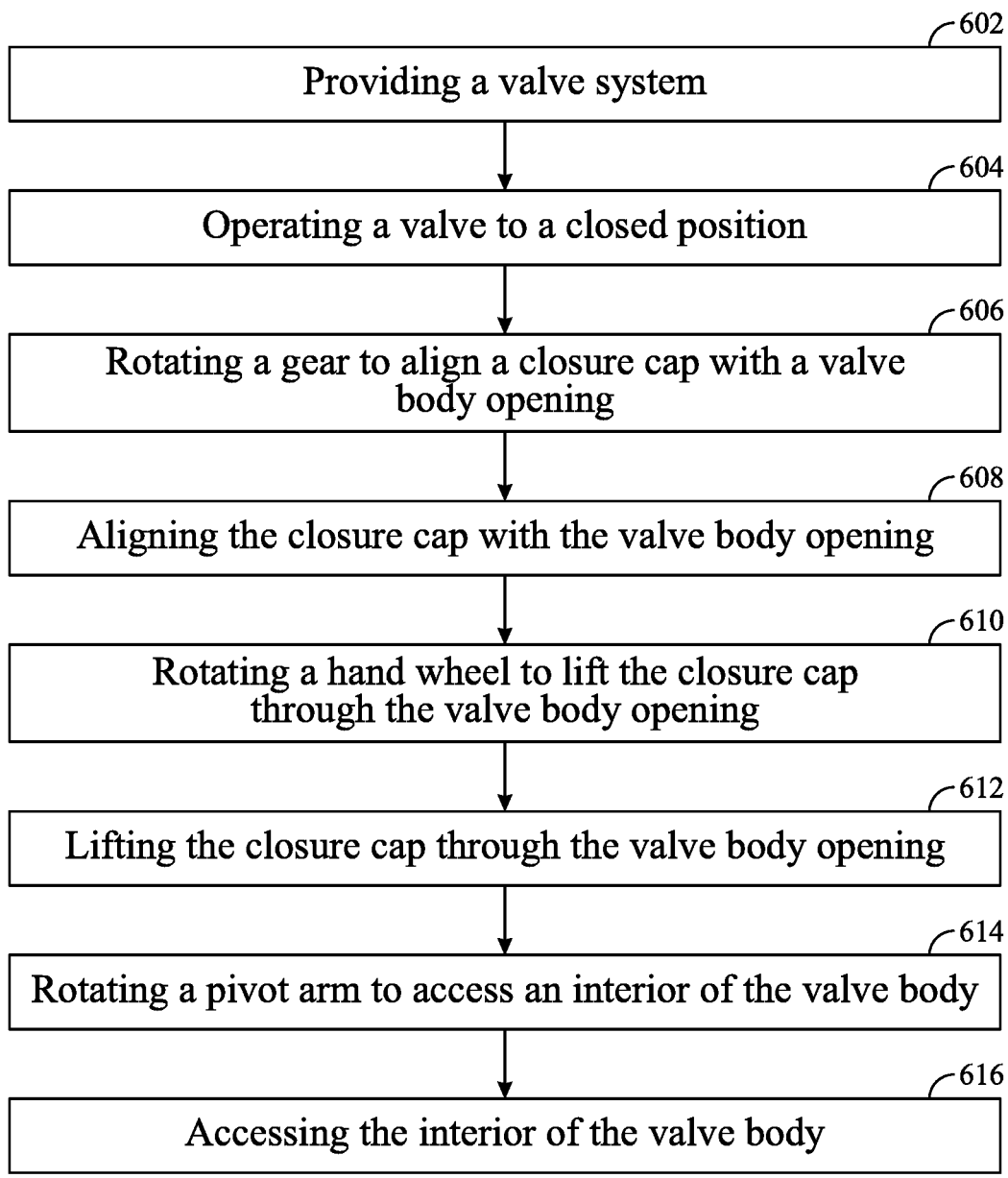
FIG. 6A illustrates a flow diagram for opening an exemplary valve system according to an embodiment of the present invention.
Figure 6B:
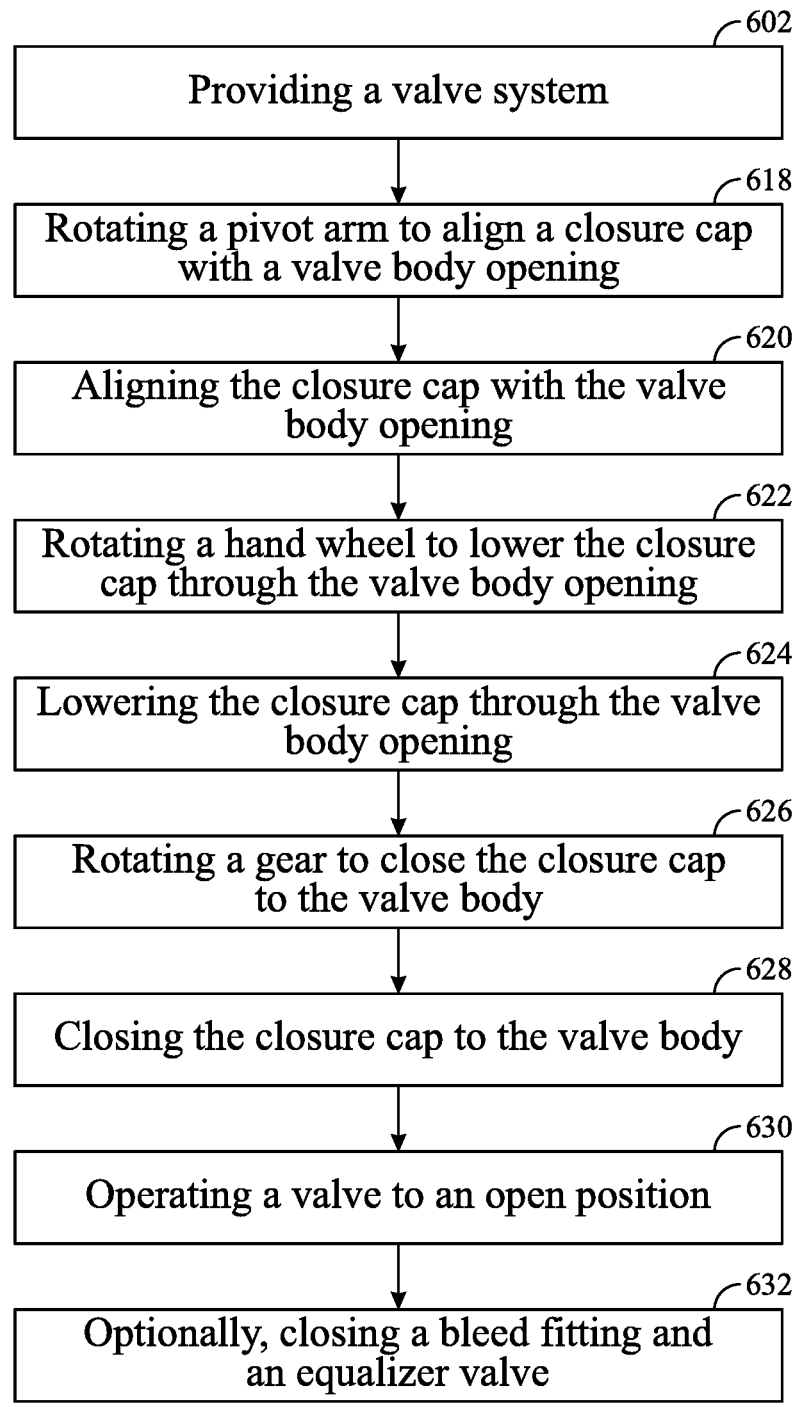
FIG. 6B illustrates a flow diagram for closing an exemplary valve system according to an embodiment of the present invention.

FIG. 6A illustrates a flow diagram for opening an exemplary valve system according to an embodiment of the present invention; and FIG. 6B illustrates a flow diagram for closing an exemplary valve system according to an embodiment of the present invention. In other words, FIGS. 6A-6B show a method of using (i.e., opening and closing) an exemplary valve system according to an embodiment of the present invention, as discussed below.

Opening an Exemplary Valve System

In an embodiment, a method of opening a valve system comprises providing a valve system 602, operating a valve to a closed position 604, rotating a gear to align a closure cap with a valve body opening 606, aligning the closure cap with the valve body opening 608, rotating a hand wheel to lift the closure cap through the valve body opening 610, lifting the closure cap through the valve body opening 612, rotating a pivot arm to access an interior of the valve body 614, and accessing the interior of the valve body 616, as shown in FIG. 6A.

In an embodiment, a method of opening a valve system comprises operating a valve to a closed position 604. Automatic or manual operation of valves from an open position to a closed position or vice versa is well known in the art. In an embodiment, the valve may be closed to prevent flow from, for example, a pipeline. In an embodiment, if the valve is a pigging valve, the valve may be closed to remove a received pig.

In an embodiment, a method of opening a valve system comprises rotating a gear to align a closure cap with a valve body opening 606. In an embodiment, the gear 362 may be rotated counterclockwise to align the closure cap 315 with the valve body 302 opening. In an embodiment, the gear 362 may be rotated counterclockwise until a stop plate 376 touches a stop plate screw 384. In an embodiment, the gear 362 may be rotated counterclockwise by a gear handle 366 until the stop plate 376 touches the stop plate screw 384.

In an alternative embodiment, the gear 362 may be rotated clockwise to align the closure cap 315 with the valve body 302 opening.

In an embodiment, a method of opening a valve system comprises rotating a hand wheel to lift the closure cap through the valve opening 610. In an embodiment the hand wheel 324 may be rotated counterclockwise until the closure cap 315 is lifted up through a valve body 302 opening.

In an alternative embodiment, the hand wheel 324 may be rotated clockwise until the closure cap 315 is lifted through the valve body 302 opening.

In an embodiment, a method of opening a valve system comprises lifting the closure cap through the valve opening 612.

In an embodiment, a method of opening a valve system comprises rotating a pivot arm to access an interior of the valve body 614. In an embodiment, the pivot arm 330 may be rotated clockwise to access an interior of the valve body 302. In an embodiment, the pivot arm 330 may be rotated clockwise by pushing a pivot arm handle 346.

In an alternative embodiment, the pivot arm 330 may be rotated counterclockwise to access the interior of the valve body 302.

In an embodiment, a collar nut 342 may be loosened to free the pivot arm 330 from the upper end of the second pillar 328.

In an embodiment, the method of opening a valve system comprises accessing the interior of the valve body 616. In an embodiment, if the valve is a pigging valve, a received pig may be lifted up through the valve body 302 opening.

Closing an Exemplary Valve System

In an embodiment, a method of closing a valve system comprises, providing a valve system 602, rotating a pivot arm to align a closure cap with a valve body opening 618, aligning the closure cap with the valve body opening 620, rotating a hand wheel to lower the closure cap through the valve body opening 622, lowering the closure cap through the valve body opening 624, rotating a gear to close the closure cap to the valve body 626, closing the closure cap to the valve body 628, and automatically actuating or manually operating a valve to an open position to permit flow from the pipeline 630, as shown in FIG. 6B.

In an embodiment, a method of closing a valve system comprises rotating a pivot arm to align a closure cap with a valve opening 618. In an embodiment, the pivot arm 330 may be rotated counterclockwise until the pivot arm 330 touches an upper end of the second pillar 328. In an embodiment, the pivot arm 330 may be rotated counterclockwise by pulling a pivot arm handle 346 until the pivot arm 330 touches the upper end of the second pillar 328. In an embodiment, the pivot arm 330 may touch a pivot collar 303 of a second pillar 328.

In an alternative embodiment, the pivot arm 330 may be rotated clockwise until the pivot arm 330 touches an upper end of a second pillar 328. In an embodiment, the pivot arm 330 may touch a pivot collar 303 of a second pillar 328.

In an embodiment, a collar nut 342 may be tightened to secure the pivot arm 330 to the upper end of the second pillar 328.

In an embodiment, a method of closing a valve system comprises rotating a hand wheel to lower a closure cap through a valve body opening 622. In an embodiment, the hand wheel 324 may be rotated clockwise to lower the closure cap 315 through the valve body 302 opening. In an embodiment, the hand wheel 324 may be rotated clockwise until a stop block 368 touches an upper pivot arm plate 332.

In an alternative embodiment, the hand wheel 324 may be rotated counterclockwise to lower the closure cap 315 through the valve body 302 opening.

In an embodiment, a method of closing a valve system comprises rotating a gear to close the closure cap to the valve body 626. In an embodiment, the gear 362 may be rotated clockwise to close the closure cap 315 to the valve body 302. In an embodiment, the gear 362 may be rotated clockwise until a stop plate 376 touches a stop screw 384. In an embodiment, the gear 362 may be rotated clockwise by a gear handle 366 until a stop plate 376 touches a stop screw 384.

In an alternative embodiment, the gear 362 may be rotated counterclockwise to close the closure cap 315 to the valve body 302.

In an embodiment, a method of closing a valve system comprises operating the valve to an open position 630. Automatic or manual operation of valves from an open position to a closed position or vice versa is well known in the art. In an embodiment, the valve may be opened to receive flow from, for example, a pipeline. In an embodiment, if the valve is a pigging valve, the valve may be opened to receive a pig from the pipeline.

In an embodiment, a method of closing a valve system further comprises closing a bleed fitting and an equalizer valve 632. In an embodiment, a bleed fitting 312 and an equalizer valve 355 may be closed. In an embodiment, a lock plate 3108 may be inserted into the bleed fitting 312, and the equalizer valve 355 and the bleed fitting 312 may be closed.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms (e.g., "outer" and "inner," "upper" and "lower," "first" and "second," "internal" and "external," "above" and "below" and the like) are used as words of convenience to provide reference points and, as such, are not to be construed as limiting terms.

The embodiments set forth herein are presented to best explain the present invention and its practical application and to thereby enable those skilled in the art to make and utilize the invention. However, those skilled in the art will recognize that the foregoing description has been presented for the purpose of illustration and example only. The description as set forth is not intended to be exhaustive or to limit the invention to the precise form disclosed. Many modifications and variations are possible in light of the above teaching without departing from the spirit and scope of the following claims. For example, the dual-pillar davit system and/or threadless closure cap may be adapted to work with any other type of valve. The invention is specifically intended to be as broad as the claims below and their equivalents.

Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

Definitions

As used herein, the terms "a," "an," "the," and "said" mean one or more, unless the context dictates otherwise.

As used herein, the term "about" means the stated value plus or minus a margin of error or plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the term "simultaneously" means occurring at the same time or about the same time, including concurrently.

Incorporation By Reference. All patents and patent applications, articles, reports, and other documents cited herein are fully incorporated by reference to the extent they are not inconsistent with this invention.

What is claimed is:

1. A valve system comprises:
   (a) a valve comprising
      i. a valve body having an opening and an interior,
      ii. wherein the valve may be operated to a closed or to an open position;
   (b) a davit system comprising:
      i. a first pillar having an upper end and a lower end, wherein the lower end of the first pillar is attached to an upper surface of the valve body;
      ii. a second pillar having an upper end and a lower end, wherein the lower end of the second pillar is attached to an upper surface of the valve body;
      iii. a pivot arm having a first end and a second end, wherein the first end of the pivot arm is rotationally attached to the upper end of the first pillar, wherein the second end of the pivot arm is removably attached to the upper end of the second pillar and wherein the pivot arm straddles the valve body opening when the second end of the pivot arm touches the upper end of the second pillar; and
   (c) a closure cap system comprising:
      i. a closure cap adapted to seal the valve body opening, wherein a means for sealing the closure cap is disposed between the closure cap and the valve body when the closure cap is in a closed position; and
      ii. a cap stem having an upper end and a lower end, wherein the lower end of the cap stem is attached to the closure cap and the upper end of the cap stem is disposed through a central portion of the pivot arm; and iii. wherein a means for lifting and lowering the closure cap engages the cap stem to lift or lower the closure cap.

2. The valve system of claim 1, wherein the valve body has a first end and a second end, the first end of the valve body is fluidly connected to a first adapter or connection pipe and the second end of the valve body is fluidly connected to a second adapter or connection pipe.

3. The valve system of claim 2, wherein the valve body is connected to the first adapter or connection pipe via a trapezoidal thread connection and the second end of the valve body is connected to the second adapter or connection pipe via a trapezoidal thread connection.

4. The valve system of claim 3, wherein the first adapter or connection pipe has an equalizer valve disposed through a wall of the first adapter or connection pipe.

5. The valve system of claim 1, wherein the first end of the pivot arm touches a pivot collar of the first pillar and the second end of the pivot arm touches a pivot collar of the second pillar.

6. The valve system of claim 1 further comprising a pivot arm bearing, wherein the pivot arm bearing is disposed between the first end of the pivot arm and the upper end of the first pillar.

7. The valve system of claim 6 further comprising an upper collar thrust bearing and a lower collar thrust bearing, wherein the pivot arm bearing is disposed between the upper collar thrust bearing and the lower collar thrust bearing.

8. The valve system of claim 1, wherein the upper end of the first pillar is adapted to accept a cap nut and the upper end of the second pillar is adapted to accept a collar nut.

9. The valve system of claim 1 wherein the second end of the pivot arm further comprises a pivot arm handle.

10. The valve system of claim 1, wherein the means for sealing the closure cap comprises a closure cap O-ring.

11. The valve system of claim 1, wherein the means for sealing the closure cap comprises a cap-to-clamp connection between the valve body and the closure cap.

12. The valve system of claim 1, wherein the closure cap is a threadless closure cap.

13. The valve system of claim 1, further comprising a means for rotating the closure cap, wherein the means for rotating the closure cap engages the closure cap to rotate from an open position to a closed position or from the closed position to the open position.

14. The valve system of claim 13, wherein the means for rotating the closure cap comprises a rack having rack teeth, a gear having an upper end and a lower end and gear teeth on an outer surface, and a gear screw having an upper end and a lower end, wherein the gear is attached to the upper end of the gear screw and the closure cap is attached to the lower end of the gear screw and wherein the rack teeth and the gear teeth engage each other to rotate the closure cap from the open position to the closed position or from the closed position to the open position.

15. The valve system of claim 14, wherein the rack is attached to an upper surface of the closure cap adjacent to the valve body.

16. The valve system of claim 14, wherein the means for rotating the closure cap further comprises a gear bearing, wherein the gear bearing is disposed between the gear and the upper end of the gear screw.

17. The valve system of claim 14, wherein the means for rotating the closure cap further comprises a hand wrench or gear handle adapted to fit the upper end of the gear screw.

18. The valve system of claim 14 further comprising a stop plate having a first end and a second end, wherein the stop plate is attached to an upper surface of the closure cap adjacent to the rack and the valve body.

19. The valve system of claim 14 further comprising a lock plate, wherein the lock plate is attached to an upper surface of the valve body adjacent to the first end of the stop plate and the valve body opening.

20. The valve system of claim 13, wherein the means for rotating the closure cap comprises a horizontal handle attached to an upper surface of the closure cap.

21. The valve system of claim 13 further comprising a lock plate system, wherein the lock plate system is attached to an upper surface of the valve body and mechanically connected to an upper surface of the closure cap.

22. The valve system of claim 1, wherein the means for lifting and lowering the closure cap comprises a cap handle or hand wheel attached to an upper end of the cap stem, wherein the cap stem is a threaded cap stem.

23. The valve system of 22, wherein a stop block is disposed between the cap handle or hand wheel and the upper pivot arm plate.

24. The valve system of claim 1, wherein the means for lifting and lowering the closure cap further comprises an upper pivot plate, a lower pivot arm plate and a threaded cap stem nut, wherein the upper pivot plate is attached to an upper surface of the pivot arm, the lower pivot arm plate is attached to a lower surface of the pivot arm plate, the threaded cap stem nut is disposed between the upper pivot arm plate and the lower pivot arm plate.

25. The valve system of claim 24, wherein a spring is disposed between the upper pivot arm plate and the threaded cap nut.

26. The valve system of claim 1, wherein the means for lifting and lowering a closure cap comprises a slotted cap stem and a jack system attached to an upper surface of the pivot arm.

27. A method of opening a valve system comprises the steps:
(a) providing the valve system of claim 1;
(b) operating the valve to a closed position to prevent flow from a pipeline;
(c) rotating a gear to align the closure cap with the valve body opening;
(d) aligning the closure cap with the valve body opening;
(e) rotating a cap handle or hand wheel to lift the closure cap through the valve body opening;
(f) lifting the closure cap through the valve body opening;
(g) rotating the pivot arm to access an interior of the valve body; and
(h) accessing the interior of the valve body.

28. The method of claim 27, wherein step b) comprises operating the valve to a closed position to remove a pig.

29. The method of claim 27, wherein step c) comprises rotating the gear until a stop plate touches a stop plate screw.

30. The method of claim 27, wherein step c) comprises rotating the gear by a handle until a stop plate touches a stop plate screw.

31. The method of claim 27, wherein step g) comprises g-1) loosening a collar nut to rotate a pivot arm, and step g-2) comprises rotating the pivot arm to access the interior of the valve body.

32. The method of claim 27, wherein step g) comprises g-1) loosening a collar nut to rotate a pivot arm, and step g-2) comprises rotating the pivot arm by pushing a handle to access the interior of the valve body.

33. The method of claim 27, wherein step h) comprises accessing the interior of the valve body to lift a received pig up through the valve body opening.

34. A method of closing a valve system comprises the steps:
   (a) providing the valve system of claim 1;
   (b) rotating the pivot arm to align a closure cap with a valve body opening;
   (c) aligning the closure cap with the valve body opening;
   (d) rotating a cap handle or a hand wheel to lower the closure cap through the valve body opening;
   (e) lowering the closure cap through the valve body opening;
   (f) rotating a gear to close the closure cap to the valve body;
   (g) closing the closure cap to the valve body;
   (h) operating the valve to an open position to permit flow from a pipeline.

35. The method of claim 34, wherein step b) comprises rotating the pivot arm until the pivot arm touches the pivot collar of the second pillar.

36. The method of claim 34, wherein step b) comprises rotating the pivot arm by pulling a handle until the pivot arm touches the pivot collar of the second pillar.

37. The method of claim 34, wherein step b) comprises b-1) rotating the pivot arm until the pivot arm touches a pivot collar of the second pillar, and b-2) tightening a collar nut to secure the pivot arm to the pivot collar of the second pillar.

38. The method of claim 34, wherein step b) comprises b-1) rotating the pivot arm by pulling a handle until the pivot arm touches a pivot collar of the second pillar, and b-2) tightening a collar nut to secure the pivot arm to the pivot collar of the second pillar.

39. The method of claim 34, wherein step d) comprises rotating the hand wheel until a stop block touches an upper pivot arm plate.

40. The method of claim 34, wherein step f) comprises rotating the gear until a stop plate touches a stop screw.

41. The method of claim 34, wherein step f) comprises rotating the gear by a handle until a stop plate touches a stop screw.

42. The method of claim 34, wherein step h) comprises automatically actuating or manually operating the valve to an open position to receive a pig.

43. The method of claim 34, further comprising the step i) closing a bleed fitting and an equalizer valve.

44. The method of claim 34, wherein step i) comprises i-1) inserting a lock plate into a bleed fitting, and i-2) closing an equalizer valve and the bleed fitting.

* * * * *